United States Patent
Honnavara-Prasad (10) Patent No.: US 12,373,018 B2
(45) Date of Patent: *Jul. 29, 2025

(54) POWER OPTIMIZATION IN AN ARTIFICIAL INTELLIGENCE PROCESSOR

(71) Applicant: Groq, Inc., Mountain View, CA (US)

(72) Inventor: Sushma Honnavara-Prasad, San Jose, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,156

(22) Filed: Jan. 18, 2024

(65) Prior Publication Data
US 2024/0152197 A1 May 9, 2024

Related U.S. Application Data (63) Continuation of application No. 16/951,487, filed on Nov. 18, 2020, now Pat. No. 11,892,896, which is a (Continued)

(51) Int. Cl.
*G06F 1/26* (2006.01)
*G06F 1/28* (2006.01)
(Continued)

(52) U.S. Cl.
CPC ............ *G06F 1/329* (2013.01); *G06F 1/28* (2013.01); *G06F 9/4893* (2013.01); *G06N 3/045* (2023.01); *G06N 3/08* (2013.01)

(58) Field of Classification Search
CPC .......... G06F 1/329; G06F 1/28; G06F 9/4893; G06F 8/31; G06F 8/4432; G06N 3/045; G06N 3/08; G06N 3/063; Y02D 10/00
See application file for complete search history.

(56) References Cited

U.S. PATENT DOCUMENTS

| 7,287,173 B2 * | 10/2007 | Hsieh .................. G06F 8/4432 713/320 |
| 10,217,061 B2 | 2/2019 | Hayes et al. |

(Continued)

OTHER PUBLICATIONS

U.S. Appl. No. 16/216,194, filed Dec. 11, 2018.
(Continued)

*Primary Examiner* — Xuxing Chen
(74) *Attorney, Agent, or Firm* — Dority & Manning, P.A.

(57) ABSTRACT

In one embodiment, the present disclosure includes a method of reducing power in an artificial intelligence processor. For each cycle, over a plurality of cycles, an AI model is translated into operations executable on an artificial intelligence processor. The translating is based on power parameters that correspond to power consumption and performance of the artificial intelligence processor. The AI processor is configured with the executable operations, and input activation data sets are processed. Accordingly, result sets, power consumption data, and performance data are generated and stored over the plurality of cycles. The method further includes training an AI algorithm using the stored parameters, the power consumption data, and the performance data. A trained AI algorithm outputs a plurality of optimized parameters to reduce power consumption of the AI processor. The AI model is then translated into optimized executable operations based on the plurality of optimized parameters.

20 Claims, 5 Drawing Sheets

Related U.S. Application Data continuation of application No. 16/216,194, filed on Dec. 11, 2018, now Pat. No. 10,884,485.

(51) Int. Cl.

| | |
|---|---|
| *G06F 1/32* | (2019.01) |
| *G06F 1/329* | (2019.01) |
| *G06F 9/48* | (2006.01) |
| *G06N 3/045* | (2023.01) |
| *G06N 3/08* | (2023.01) |

(56) References Cited

U.S. PATENT DOCUMENTS

| | | | |
|---|---|---|---|
| 10,671,147 | B2 | 6/2020 | Rotem et al. |
| 11,106,261 | B2 | 8/2021 | Naik et al. |
| 2019/0095794 | A1 | 3/2019 | Lopez et al. |
| 2019/0244139 | A1 | 8/2019 | Varadarajan et al. |
| 2019/0369696 | A1 | 12/2019 | Heilper et al. |

OTHER PUBLICATIONS

U.S. Appl. No. 16/951,487, filed Nov. 18, 2020.
Cai et al., "NeuralPower: Predict and Deploy Energy-Efficient Convolutional Neural Networks", Asian Conference on Machine Learning, 2017, 19 pages.
Chen et al., "Learning to Optimize Tensor Programs", arXiv: 1805.08166v3, Nov. 29, 2018, 16 pages.
Chen et al., "Learning to Optimize Tensor Programs," arXiv: 1805.08166, May 21, 2018, pp. 17 pages.
Chen et al., "TVM: End-to-End Optimization Stack for Deep Learning", arXiv:1802.04799, Feb. 12, 2018, 19 pages.
Ji et al., "Bridging the Gap Between Neural Networks and Neuromorphic Hardware with a Neural Network Compiler", Architectural Support for Programming Languages and Operating Systems, Mar. 2018, pp. 448-460.
International Search Report and Written Opinion received for PCT Application Serial No. PCT/US2019/065527, Apr. 9, 2020, 13 pages.
Rotem et al., "Glow: Graph Lowering Compiler Techniques for Neural Networks", arXiv: 1805.00907, May 2, 2018, 10 pages.
Wang et al., "Machine Learning in Compiler Optimisation", arXiv:1805.03441, May 9, 2018, 22 pages.
Non Final Office Action received for U.S. Appl. No. 16/951,487, dated May 18, 2023, 36 pages.
Chen et al., "TVM: An Automated End-to-End Optimizing Compiler for Deep Learning", USENIX Symposium on Operating Systems Design and Implementation, Oct. 2018, 17 pages.
Notice of Allowance received for U.S. Appl. No. 16/216,194, dated Jun. 26, 2020, 19 pages.
Notice of Allowance received for U.S. Appl. No. 16/216,194, dated Oct. 15, 2020, 16 pages.
Notice of Allowance received for U.S. Appl. No. 16/951,487, dated Sep. 28, 2023, 23 pages.
Communication pursuant to Article 94(3) EPC received for EP Patent Application Serial No. 19836266.7 dated Nov. 6, 2024, 8 pages.

* cited by examiner

POWER OPTIMIZATION IN AN ARTIFICIAL INTELLIGENCE PROCESSOR

CROSS REFERENCE TO RELATED APPLICATIONS

This application is a continuation of U.S. application Ser. No. 16/951,487, filed Nov. 18, 2020, which is a continuation of U.S. application Ser. No. 16/216,194 (now U.S. Pat. No. 10,884,485), filed Dec. 11, 2018. The above noted applications are expressly incorporated herein by reference in their entireties.

BACKGROUND

The present disclosure relates to optimizing power, and in particular, to power optimization in an artificial intelligence processor.

Power and performance are two critical factors that impact integrated circuits. Achieving higher performance, such as faster processing speeds and lower latencies, for example, are a constant goal. However, higher performance typically comes with a price—increased power consumption. Increased power consumption can lead to a wide range of problems, including heat generation, (in the aggregate) increased costs for electricity, or in extreme cases, system failure.

Artificial intelligence (AI) processors may perform very large numbers of computations in parallel using arrays of memory and other computational resources. Accordingly, achieving high performance with optimal power consumption is an important technical challenge. Techniques for optimizing power and performance in an AI processor are, therefore, highly desirable.

SUMMARY

Embodiments of the present disclosure pertain to power optimization in an artificial intelligence processor. In one embodiment, the present disclosure includes a method of reducing power in an artificial intelligence processor comprising, for each cycle, over a plurality of cycles, translating, in a compiler operating on a computer, an artificial intelligence model into a plurality of executable operations for execution on an artificial intelligence processor, wherein said translating is based on a plurality of parameters, and wherein the parameters correspond to power consumption and performance of the artificial intelligence processor, configuring said artificial intelligence processor with the plurality of executable operations, processing a plurality of input activation data sets in the artificial intelligence processor, and in accordance therewith, generating result sets, power consumption data, and performance data based on the executable operations, and storing at least a portion of the parameters, the power consumption data, and the performance data over the plurality of cycles. The method further includes training an artificial intelligence algorithm using the stored parameters, the power consumption data, and the performance data, wherein a trained artificial intelligence algorithm outputs a plurality of optimized parameters of said plurality of parameters to reduce power consumption of the artificial intelligence processor, and translating the artificial intelligence model into a plurality of optimized executable operations based on the plurality of optimized parameters.

In one embodiment, the compiler comprises a first stage for translating the artificial intelligence model into a second artificial intelligence model, and wherein the first stage receives first parameters of the plurality of parameters for selectively mapping a plurality of input elements of the artificial intelligence model into a plurality of output elements of the second artificial intelligence model, wherein mapping the input elements to first output elements corresponds to a first power consumption and mapping the input elements to second output elements corresponds to a second power consumption.

In one embodiment, the first stage resolves dependencies in the artificial intelligence model to determine model operations that can be performed in parallel, and wherein fifth parameters of the plurality of parameters adjust the number of parallel model operations included in the second artificial intelligence model.

In one embodiment, translating, by the first stage, comprises converting convolutions to matrix multiplications performed by a first circuit block in the artificial intelligence processor and vector operations performed by a second circuit block in the artificial intelligence processor, wherein a first translation of the artificial intelligence model into a second artificial intelligence model based on first values of said first parameters includes fewer matrix multiplications, more vector operations, and a lower power consumption than a second translation of the artificial intelligence model into a second artificial intelligence model based on second values of said first parameters.

In one embodiment, the compiler comprises a second stage for translating the second artificial intelligence model into the plurality of executable operations, wherein a portion of the executable operations control functional circuit blocks on the artificial intelligence processor, and wherein the second stage receives second parameters of the plurality of parameters for selectively mapping the second artificial intelligence model into the plurality of executable operations, wherein mapping the second artificial intelligence model into a first plurality of executable operations corresponds to a first power consumption and mapping the second artificial intelligence model into a second plurality of executable operations corresponds to a second power consumption.

In one embodiment, the compiler comprises a second stage for scheduling the executable operations, and wherein the second stage receives third parameters of the plurality of parameters for selectively scheduling the executable operations, wherein a first schedule of the executable operations corresponds to a first power consumption and a second schedule of the executable operations corresponds to a second power consumption.

In one embodiment, the second stage schedules one or more no operation (NOOP) operations in response to the third parameters to control the amount of power consumed during execution.

In one embodiment, a portion of the executable operations, configured in the artificial intelligence processor, dynamically program a plurality of circuit blocks of the artificial intelligence processor, wherein the portion of the executable operations turn different circuit block subsystems on and off at predetermined time periods during said processing of the plurality of input activation data sets in the artificial intelligence processor to reduce power, and wherein fourth parameters of the plurality of parameters control said dynamic programming.

In one embodiment, the artificial intelligence processor comprises a matrix multiplication circuit, and wherein the fourth parameters turn contiguous matrix multiplication circuit subsystems on and off.

In one embodiment, the artificial intelligence model is a neural network model.

In another embodiment, the present disclosure includes a system comprising an artificial intelligence processor, one or more computer processors (e.g., a host server), and a non-transitory computer-readable storage medium having stored thereon computer executable instructions, which when executed by at least one computer processor, cause the at least one computer processor to be operable for performing the techniques described herein.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
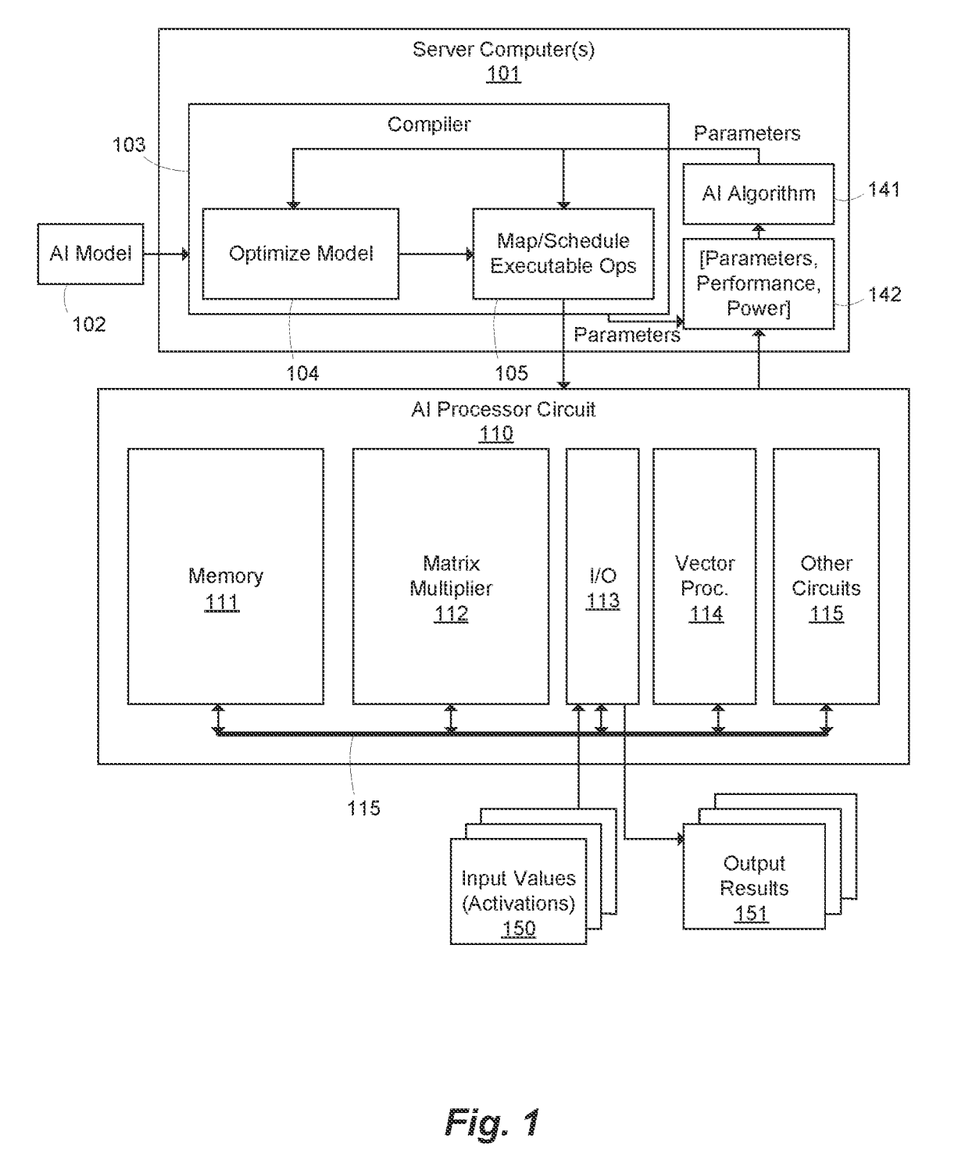
FIG. 1 illustrates an AI processor system according to one embodiment.

FIG. 1 illustrates an AI processor system according to one embodiment. Features and advantages of the present disclosure include translating an artificial intelligence model based on parameters (sometimes referred to herein as "power parameters") to produce executable operations that optimize power and performance when executed in an AI processor. For example, an AI model 102 may be translated into executable instructions using a compiler 103 executing on server computer system 101, for example. One example AI model 102 is a neural network model comprising a network of weights. A more specific example may include a Tensorflow model. Compiler 103 translates AI model 102 into executable operations performed on an artificial intelligence processor circuit 110. The term compiler is used here broadly to refer to one or more executable software components that receive the AI model, perform a number of processing steps, and output instructions for configuring the AI processor 110. In one embodiment, compiler 103 may comprise a plurality of stages. For example, a first stage 104 may receive the AI model and perform model optimization to produce an optimized AI model (e.g., with fewer elements or elements that have been reconfigured to achieve the same result more efficiently). In this example, the optimized model is received by a second stage 105, which may convert the AI model to executable operations. As described in more detail below, the executable operations may be linked to particular circuit blocks in the AI processor 110. For example, operations may be linked to memory reads or writes in a memory circuit 111, matrix multiplications in a matrix multiplier 112, vector multiplications in a vector processor 114, data transfers over bus 115, or other data transformations and manipulations in other circuit blocks 115 of AI processor 110, for example. In this example, second stage 105 may perform a scheduling function, which may deterministically schedule each executable operation to implement the AI model on input values 150 ("activations") received in an input/output circuit 113, for example, and produce output results 151.

Advantageously, compiler 103 may be configured with parameters to modify the translation process to optimize power and performance. For example, translating the AI model into the executable operations may be based on a plurality of parameters. The parameters may modify various steps of the translation process that impact power and performance. Translating an AI model into executable operations may entail a wide range of choices that impact power and performance (e.g., what operations can be performed in parallel, the structure of the optimized AI model itself, the number of matrix multiplications versus the number of vector operations, how the model is mapped to the particular operations, and the scheduling of such operations in the AI processor). Power parameters may be used to modify a wide range of decisions made by compiler 103, thereby changing the performance and power achieved by AI processor 110. Power and performance are observable results stemming from different values of parameters and different combinations of such values, for example. Accordingly, embodiments of the disclosure may advantageously gather and store power and performance data, and the parameter values that generated them, and train an AI algorithm 141 to optimize the parameters such that power and performance are optimized.

For example, an AI model 102 may be received and translated by compiler 103 to produce executable operations using one set of power parameters. The AI processor may then be configured with the executable operations. Once configured, a plurality of input activation data sets may be processed in the AI processor 110 to generate result sets, power consumption data, and performance data.

The power parameters may be used as features input to an AI algorithm. Accordingly, a corpus of power parameters, power consumption data, and performance data over many execution cycles (e.g., where activations are processed and results produced) may be stored at 142 (e.g., in a data repository on computer system 101) to form a training set, for example. The training set may be used to train AI algorithm 141. The trained AI algorithm, in turn, may output a plurality of optimized parameters to reduce power consumption of the artificial intelligence processor, for example. The parameters may be trained to optimize power consumption and performance based on the corpus 142 of past power and performance for different parameters, for example. Accordingly, AI model 102 may be translated again into a new set of executable operations based on the optimized parameters from AI algorithm 141. When the new executable operations are used to configure AI processor 110, input activations may be processed more efficiently.

Figure 2:
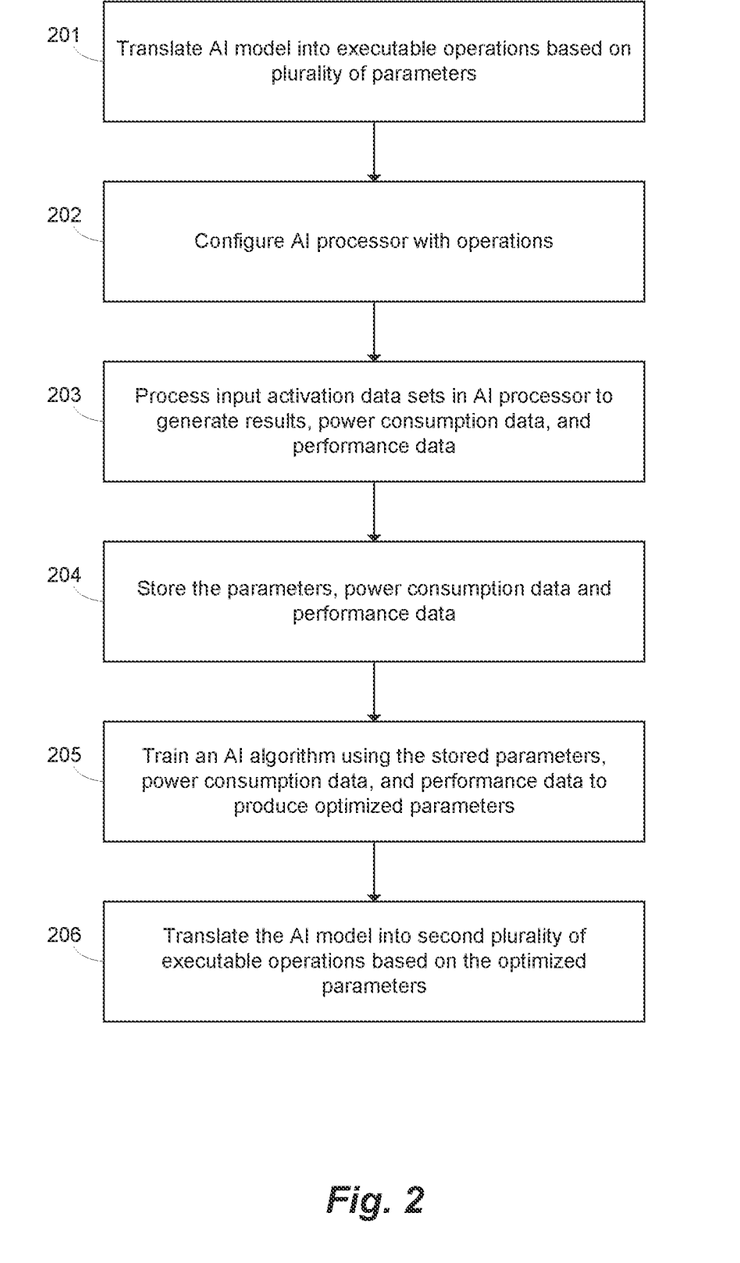
FIG. 2 illustrates a method of optimizing power and performance in an AI processor according to an embodiment.

FIG. 2 illustrates a method of optimizing power and performance in an AI processor according to an embodiment. At 201, an AI model is translated into a first plurality of executable operations based on a plurality of parameters (e.g., power parameters that modify the translation process to change the power and performance of the AI processor when the operations are executed). At 202, the AI processor is configured with the operations. At 203, a plurality of input activation data sets are processed in the AI processor to generate results sets, power consumption data, and performance data based on the operations. At 204, at least a portion of the parameters, the power consumption data, and the performance data are stored (e.g., in a data repository). At 205, an artificial intelligence algorithm is trained using the stored parameters, the power consumption data, and the performance data for a plurality of said translating and processing steps. For example, the stored data set may be based on translating the same or different AI models over numerous different translation cycles using different parameters to obtain different power and performance data from processing numerous activations. The trained artificial intelligence algorithm outputs a plurality of optimized parameters to reduce power consumption of the AI processor. At 206, the AI model is again translated into a second plurality of operations based on the plurality of optimized parameters. The second plurality of executable operations may be deployed to the AI processor to process input activations with improved power and performance, for example.

Figure 3:
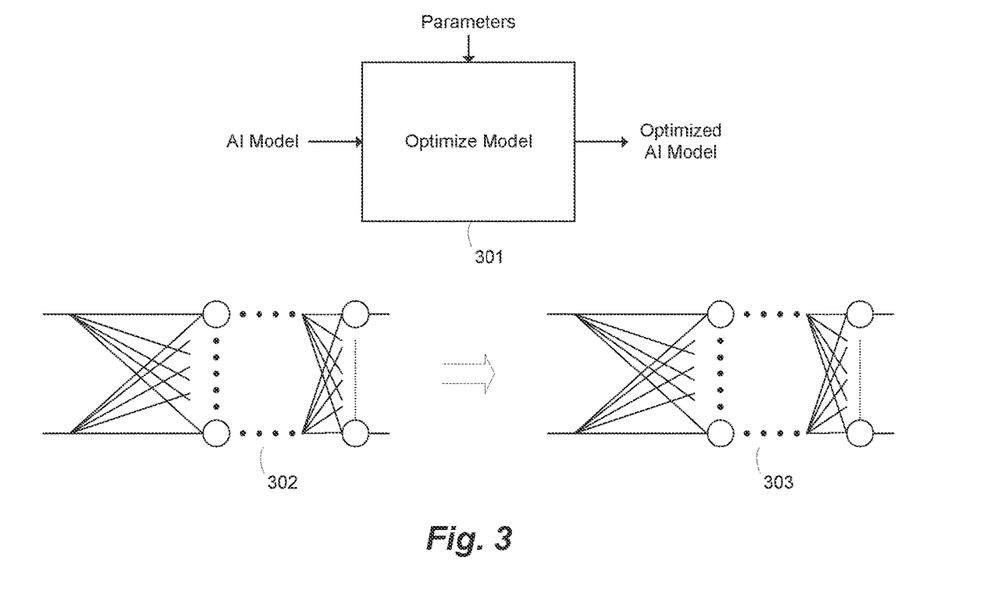
FIG. 3 illustrates power parameters for a first stage of an AI compiler according to an embodiment.
Figure 4A:
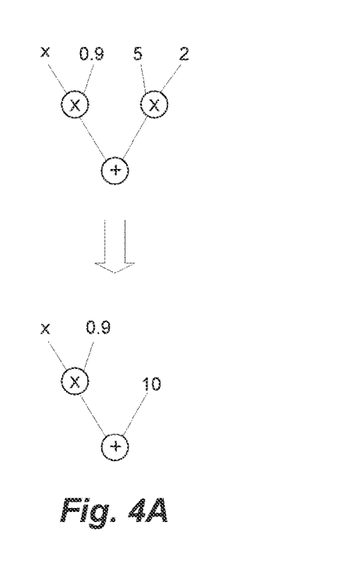
FIG. 4A illustrates an artificial intelligence (AI) model represented as a graph and being collapsed to have fewer elements according to an embodiment.

FIG. 3 illustrates power parameters for a first stage of an AI compiler according to an embodiment. As mentioned above, the first stage 301 of an AI compiler may receive an AI model, reconfigure the model, and output an optimized AI model. Translating the AI model into an optimized AI model may include pruning the model to remove training nodes, collapsing nodes that merely involve constant values (e.g., with no dependencies on activations), normalizing the nodes (e.g., include zero padding or do not include zero padding—sometimes referred to as "same" and "valid" conversion), converting elements of the model to matrix multiplications or vector operations, and other data transformations and manipulations required to execute the AI model, for example. In some embodiments, AI model 302 may be represented as a graph, such as a Tensorflow graph, for example. The graph may model an AI algorithm as a series of elements comprising values and mathematical operations, for example. An example optimization is shown in FIG. 4A, which shows a model being collapsed to have fewer elements. In FIG. 4A, constant values 5 and 2 do not depend on any input activation values, x. Accordingly, the model may be optimized as shown. This is sometimes referred to as constant folding.

As illustrated in FIG. 3, stage 301 receives first parameters for selectively mapping a plurality of input elements of the AI model (e.g., nodes of a graph) into a plurality of output elements of the output AI model. For instance, mapping the input elements to one set of output elements may correspond to a first power consumption and mapping the input elements to a different set of output elements may correspond to a second power consumption—even though the resulting AI processing of the activations produces the same result, for example. In this example, the input AI model 302 and optimized output AI model 303 may be neural network models. The parameters may selectively control how AI model 302 is modified to obtain output AI model 303. The parameters may selectively control modifications of the input model 302 that impact power and performance. For example, stage 301 may resolves dependencies in the AI model 302 to determine model operations that can be performed in parallel. One or more of the parameters may adjust the number of parallel model operations included in the output AI model 303, for example. More parallelism may increase performance but also increase power consumption at a given moment. Thus, adjusting parallelism using the parameters may optimize the performance of the system, for example.

Figure 4B:
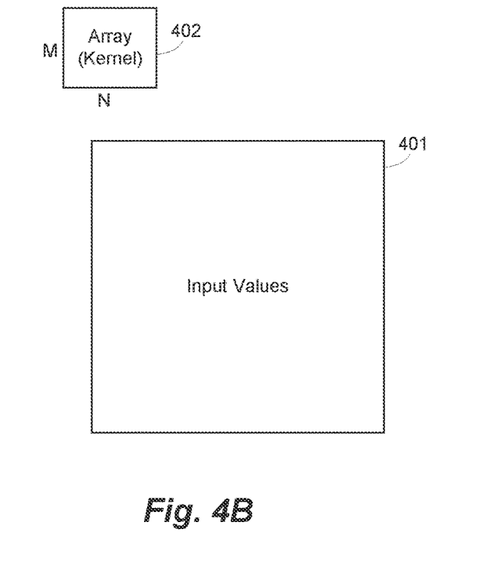
FIG. 4B Illustrates a convolution according to an embodiment.

As another example, translating model 302 into model 303 may include converting convolutions into operations supported by circuit blocks of the AI processor. An example of matrix convolution of a kernel of weights in an AI model and an array of input values is shown in FIG. 4B. In this illustrative example, an M×N kernel of weight values 402 is applied across an array of input values 401. The kernel 402 is applied sequentially across the width and height of the array of input values 401. At each step, the overlapping weight values in the kernel are multiplied by the input values, and the results are summed. Accordingly, matrix convolutions may be decomposed into multiply and add operations, which may be assigned to different circuit blocks in the AI processor, such as a matrix multiplier or vector processor. Multiplier arrays are faster but typically consume more power than a vector processor. Accordingly, assigning operations in a convolution may impact performance and power. In one embodiment, one translation of an AI model into an optimized AI model may use parameter values for stage 301 which result in more matrix multiplications, fewer vector operations, and a higher power consumption with higher performance (e.g., faster results). However, to reduce power consumption, another translation of an AI model into an optimized AI model may be based on first values of the parameters which result in fewer matrix multiplications, more vector operations, and a lower power. The AI algorithm 141 of FIG. 1 may determine, through training, that an optimum performance/power tradeoff may include reducing power (e.g., for certain operations or at certain times in the processing) by setting the parameter values so that a lower power vector processor circuit block is used rather than a more power hungry matrix multiplier, for example. As another example, convolutions may be performed in a variety of ways (or modes). Some modes may be faster and consume more power (e.g., by performing convolutions in parallel) while other modes may be slower but consume less power. In an AI process that supports multiple convolution algorithms, embodiments of the disclosure may include parameters to selecting the convolution mode. Accordingly, such parameters, and the resulting performance and power, may be stored and used to train and optimize (together with the other parameters) an AI algorithm to produce optimum power and performance, for example.

Figure 5:
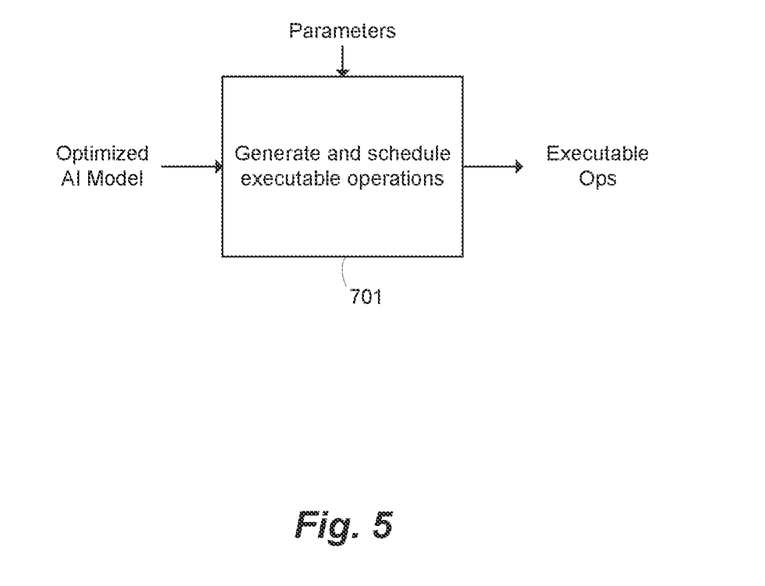
FIG. 5 illustrates power parameters for a third stage of an AI compiler according to an embodiment.

FIG. 5 illustrates power parameters for a second stage of an AI compiler according to an embodiment. In one embodiment, the compiler comprises a stage 701 for translating the optimized AI model into scheduled executable operands (aka instructions). The executable operands may be deployed to an AI processor to configure the AI processor to execute the AI model on an input data set and produce a result set. Stage 701 may further receive parameters for selectively mapping the AI model to executable operands and selectively scheduling the executable operands, for example.

In various embodiments, an AI processor may comprise a variety of hardware resources, the utilization of which may involve a power/performance tradeoff. For example, in one embodiment, an AI processor may comprise numerous data streams (or data paths. Utilizing more data paths may improve performance, but increase power consumption. Conversely, utilizing fewer data paths may reduce performance, but decrease power consumption. Accordingly, one or more parameters may control the number of data paths used in the AI processor. Additionally, in one embodiment, various processing circuit blocks in the AI processor may comprise multiple subblocks (e.g., computational elements). For example, a memory, vector processor, switch matrix, or matrix multiplier may comprise numerous subblocks (e.g., tiles or cells). If more subblocks are used, performance may improve, but more power is consumed. Conversely, if fewer subblocks are used, performance may be reduced, but less power is consumed. Accordingly, one or more parameters may control how many subblocks in each of the different circuit blocks of an AI processor are used during various times during processing.

Figure 6:
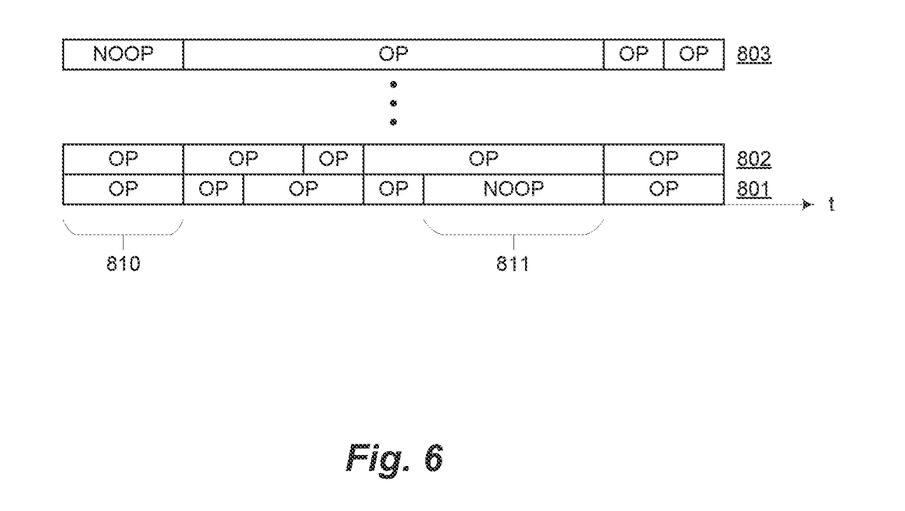
FIG. 6 illustrates executable operations from a third stage of a compiler according to an embodiment.

Furthermore, selective scheduling may be used to throttle power and performance up or down based on the parameters. For example, a first schedule of the executable operands may correspond to a first power consumption. However, changing the parameters may change various aspects of the scheduling, which may impact power and performance. Accordingly, a second schedule of the executable operands may correspond to different power consumption. As but one example, stage 701 may selectively schedule one or more no operation (NOOP) operations based on the parameters to control the amount of power consumed during execution. This technique is illustrated in FIG. 6. FIG. 6 illustrates concurrent operations 801-803 being performed in an AI processor. At time 810, operations are being performed at 801 and 802. Additional operations may be performed during time 810. However, to reduce power consumption, a NOOP may be scheduled at 803 during time 810 rather than an additional operation so that the power is reduced or maintained below a threshold level, for example, during a particular time period. Similarly, at time 811 operations may be occurring at 802 and 803. Thus, to reduce power consumption, stage 701 may schedule a NOOP instruction at 801 during time 811, for example.

Figure 7:
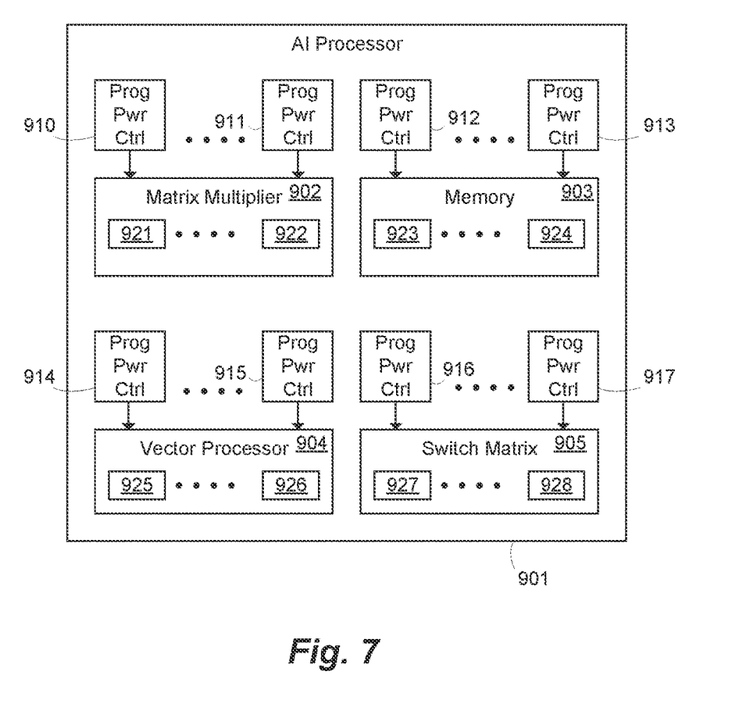
FIG. 7 illustrates dynamic programming in an AI processor according to an embodiment.

FIG. 7 illustrates dynamic programming an AI processor according to an embodiment. In one example embodiment, parameters received by stage 701 in FIG. 5 may produce executable operations that (sometimes referred to as instruction based power control or programmable power control ("Prog Pwr Ctrl")) to turn different subsystems of various circuit blocks on and off to reduce power consumption, for example. In one embodiment, an AI processor 901 may include a matrix multiplier circuit 902, memory circuit 903, vector processor circuit 904, and switch matrix circuit 905, for example. Each circuit block 902-905 may include a number of subsystems as mentioned above. For instance, matrix multiplier 902 may be divided into a plurality of multipliers 921-922, memory 903 may be divided into a plurality of memory subcells 923-924, vector processor 904 may be divided into a plurality of units for performing vector operations 925-926, and switch matrix 905 may be comprise subsystems for performing different switching operations 927-928, for example. Additionally, each circuit block 902-905 may receive executable instructions 910-917, which may be dynamically programmed to change power consumption based on parameters received in stage 701, for example. The instructions may include data bits for selectively turning subsystems 921-928 in each circuit block on and off to reduce power consumption, for example.

Figure 8:
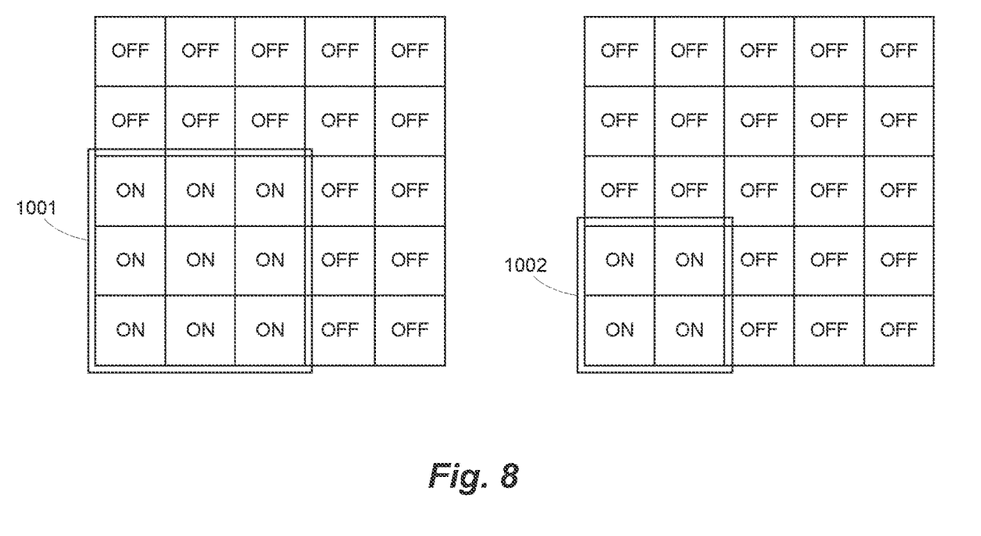
FIG. 8 illustrates dynamically turning different circuit block subsystems on and off at predetermined time periods according to an embodiment.

FIG. 8 illustrates dynamically turning different circuit block subsystems on and off at predetermined time periods according to an embodiment. As mentioned above, executable operations are generated and scheduled by stage 701. Parameters received by stage 701 may control the bits in instructions sent to the AI processor so that different subsystems are turned on and off or are used (or not) in an optimal way determined by the trained AI algorithm 141. FIG. 8 illustrates an example of turning subblocks of a matrix multiplier ("M×M") on and off (or used/not used). Different subsystems of the M×M may correspond to groups of multiplier cells, for example. Here, operations configured in the AI processor dynamically program the M×M to turn different circuit block subsystems on and off at predetermined time periods during processing of input activation data sets in the AI processor to reduce power. For example, an instruction may turn on multiplier subsections 1001 and turn off the other subsection as shown in FIG. 8 during a first time period. Similarly, during a later time period, a smaller subsection 1002 is turned on and other subsections may be turned off. From FIG. 8, one advantageous embodiment of the disclosure is illustrated. In particular, subsystems of a matrix multiplier may be turned on and off in a contiguous manner for more efficient processing, for example. In addition to turning subsections on and off to save power, stage 701 may allocate multiplication operations based on which subsystems are already on so that fewer subsystems need to be turned on and off because using a subsystem that is already on may be more power efficient than turning subsystems on and off, for example. While performance may, at times, be reduced by not utilizing the full resources of the AI processor, overall power and performance may be optimized when the parameters used to configure the dynamic programming are trained by AI algorithm, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
   a computing system configured to execute a compiler to perform operations, the operations comprising:
   receiving a set of parameters produced using power consumption data generated based on execution of first operations of a plurality of operations on an artificial intelligence (AI) processor over a first time period;
   translating a first model for the AI processor into second operations of the plurality of operations by using at least a subset of parameters from a set of parameters that control utilization of resources in the AI processor over a second time period during execution of the second operations on the AI processor;
   reconfiguring the first model into a second model for the AI processor; and
   translating the second model into the second operations by scheduling one or more no operation (NOOP)

operations using at least the subset of parameters to reduce an amount of power consumed by the AI processor over the second time period, wherein a power consumed during execution of the second operations on the AI processor over the second time period is less than another power consumed for execution of the first operations on the AI processor over the first time period, the power consumed over the second time period is maintained below a threshold level.

2. The system of claim 1, wherein the one or more operations further comprise training an AI algorithm using at least the power consumption data to produce the set of parameters, resulting in a trained AI algorithm.

3. The system of claim 2, wherein the trained AI algorithm comprises a plurality of elements representing values and mathematical operations associated with the second operations.

4. The system of claim 1, wherein reconfiguring the first model into the second model for the AI processor further comprises translating the second model into the second operations.

5. The system of claim 4, wherein reconfiguring the first model into the second model comprises selectively mapping a first plurality of elements of the first model that models resources in the AI processor utilized over the first time period into a second plurality of elements of the second model that models resources utilized over the second time period using at least the subset of parameters to reduce the amount of power consumed by the AI processor over the second time period.

6. The system of claim 4, wherein translating the second model into the second operations comprises selectively scheduling the second operations for execution on the AI processor over the second time period using at least the subset of parameters.

7. The system of claim 1, wherein the one or more operations comprise:
resolving one or more dependencies in the first model to determine a plurality of operations for parallel execution on the AI processor; and
including the plurality of operations for parallel execution on the AI processor into the second model.

8. The system of claim 1, wherein the one or more operations comprise:
configuring the resources for performing the second operations over the second time period, based on at least the subset of parameters.

9. The system of claim 1, wherein the one or more operations comprise:
determining data paths to be utilized in the AI processor during the execution of the second operations based on at least the subset of parameters.

10. The system of claim 1, wherein the one or more operations comprise:
determining one or more sub-circuits to be utilized in the AI processor during the execution of the second operations based on at least the subset of parameters.

11. The system of claim 1, wherein the one or more operations comprise:
dynamically turning on and off resources at a predetermined time during the execution of the second operations on the AI processor, based on at least the subset of parameters.

12. A method comprising:
receiving, by a compiler operating on a computer, a set of parameters produced using at least power consumption data based on executing a first plurality of operations on an AI processor over a first time period;
translating, by the compiler, a first model for the AI processor into a second plurality of operations by using at least a subset of a set of parameters that control utilization of resources in the AI processor over a second time period during execution of the second plurality of operations on the AI processor;
reconfiguring, by the compiler, the first model into a second model based on converting convolutions into matrix multiplications performed by a first portion of the resources and into vector operations performed by a second portion of the resources resulting into fewer matrix multiplications, more vector operations, and retaining consumed power over the second time period below a threshold level.

13. The method of claim 12, wherein a power consumed for executing the second plurality of operations on the AI processor over the second time period is less than a power consumed for executing the first plurality of operations on the AI processor over the first time period, the power consumed over the second time period is maintained below the threshold level.

14. The method of claim 12, wherein the first model comprises a neural network model comprising a network of weights.

15. The method of claim 14, wherein the first model comprises a tensor flow model for the AI processor.

16. The method of claim 12, wherein the AI processor comprises a matrix multiplier circuit, a memory circuit, a vector processor circuit, and a switch matrix circuit.

17. A non-transitory computer-readable storage medium having stored thereon computer executable instructions that, when executed by a compiler operating on at least one computer processor, cause the at least one computer processor to perform operations, the operations comprising:
receiving a set of parameters produced using power consumption data generated by executing a first plurality of operations on an artificial intelligence (AI) processor over a first time period;
translating a first model for the AI processor into a second plurality of operations by using at least a subset of the set of parameters from the set of parameters that control utilization of resources in the AI processor over a second time period during execution of the second plurality of operations on the AI processor; and
reconfiguring the first model into a second model based on selective control of modifications of the first model using at least the subset of the set of parameters, the modifications reducing an amount of power consumed at the AI processor over the second time period,
wherein a power consumed for executing the second plurality of operations on the AI processor over the second time period is less than another power consumed for executing the first plurality of operations on the AI processor over the first time period.

18. The non-transitory computer-readable storage medium of claim 17, wherein the power consumed over the second time period is maintained below a threshold level.

19. The non-transitory computer-readable storage medium of claim 17, wherein an AI algorithm is trained using at least the power consumption data to produce the set of parameters, resulting in a trained AI algorithm that comprises a plurality of elements representing values and mathematical operations associated with the second plurality of operations.

20. The non-transitory computer-readable storage medium of claim 17, wherein the at least one computer processor is further operable for:
- reconfiguring the first model into the second model by selectively mapping a first plurality of elements of the first model that models other resources in the AI processor utilized over the first time period into a second plurality of elements of the second model that models the resources utilized over the second time period using at least the subset of the set of parameters to reduce the amount of power consumed by the AI processor over the second time period; and
- translating the second model into the second plurality of operations.

* * * * *